United States Patent [19]

Courty

[11] 4,177,557
[45] Dec. 11, 1979

[54] TUBE CUTTER WITH A RATCHET HANDLE

[76] Inventor: Aurèle Courty, 471 Sainte-Madeleine St., Montreal, Quebec, Canada H3K 2K8

[21] Appl. No.: 938,537

[22] Filed: Aug. 31, 1978

Related U.S. Application Data

[63] Continuation-in-part of Ser. No. 869,346, Jan. 13, 1978.

[51] Int. Cl.² ............................................. B23D 21/06
[52] U.S. Cl. .......................................... 30/102; 30/99
[58] Field of Search .............................. 30/99, 98, 102

[56] References Cited

U.S. PATENT DOCUMENTS

| 164,368 | 6/1875 | Fenton | 30/102 |
|---|---|---|---|
| 882,432 | 3/1908 | Thomas | 30/99 |
| 1,507,969 | 9/1924 | Kilgour | 30/99 |
| 1,953,975 | 4/1934 | Phillis | 30/102 |
| 2,379,177 | 6/1945 | Pavey | 30/99 |
| 2,447,371 | 8/1948 | Sipsma et al. | 30/99 |
| 2,782,500 | 2/1957 | Kelley | 30/99 |
| 3,135,050 | 6/1964 | Franck | 30/102 |

*Primary Examiner*—Robert L. Sprull
*Assistant Examiner*—J. T. Zatarga

[57] ABSTRACT

A tube cutter comprises an elongated handle formed in two longitudinal halves and having a C-shaped head at one end also formed into halves and defining an opening through which a tube can be inserted, a C-shaped body rotatably mounted within the two half portions of the head and comprising an opening of substantially the same width as the opening of the C-shaped head, a pawl and ratchet system formed at least between one of the contacting surfaces of the body with a half portion of the head, and a tube cutter assembly mounted on the body and including a tube cutter member mounted on the body, a tube abutment member slidably mounted in the body for radial movement towards and away from the cutter member, and control means mounted on the body to move the abutment member towards the cutter member to press a tube between the two members, such two members having a spacing therebetween in register with the openings of such body and head whereby a tube can be inserted through the registering openings in the body and head and between the two members and the cutter member pressed against the tube and back-and-forth operation of the handle causes rotation of the body and cutter member through the pawl and ratchet system to cut the tube.

3 Claims, 9 Drawing Figures

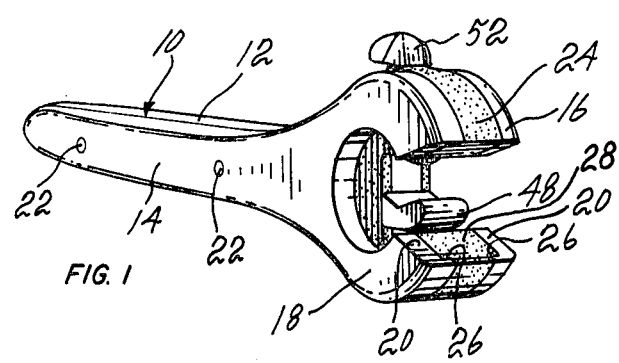
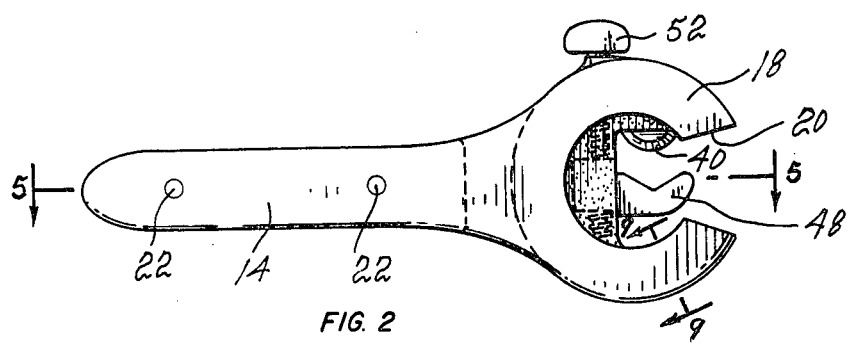
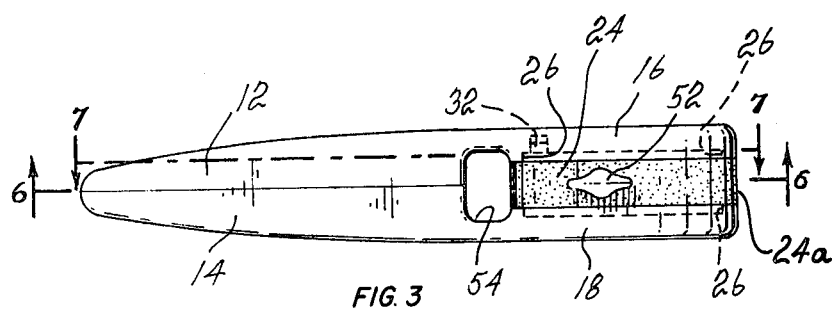
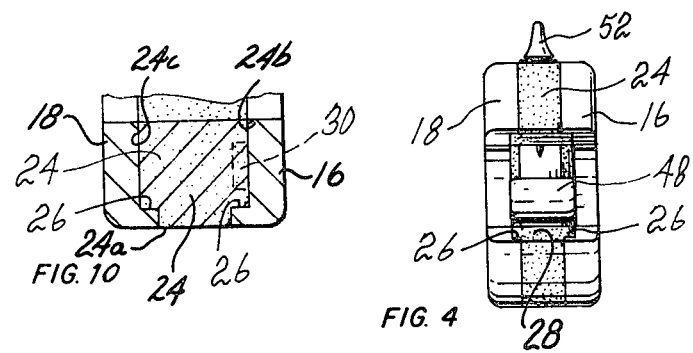

TUBE CUTTER WITH A RATCHET HANDLE

This application is a continuation-in-part of application Ser. No. 869,346 filed Jan. 13, 1978, still pending.

BACKGROUND OF THE INVENTION

The present invention relates to a tube cutter with a ratchet handle.

The above-mentioned patent application Ser. No. 869,346 discloses a tube cutter of simple and inexpensive construction which can be easily used in rather closed quarters due to its minimal external diameter relative to the maximum diameter of the tubes which can be handled by the cutter. In the above patent application, the cutter and ratchet assemblies are axially spaced from each other and require a minimum number of components. Applicant has now found that the construction of the tube cutter can still be further simplified by rearranging the relative position of the cutter and ratchet assemblies.

SUMMARY OF THE INVENTION

The tube cutter, in accordance with the invention, comprises an elongated handle formed in two longitudinal halves and having a C-shaped head at one end also formed in two halves and defining an opening through which a tube can be inserted, a C-shaped body rotatably mounted within the two half portions of the head and defining an opening of substantially the same width as the opening of the C-shaped head, a pawl and ratchet system formed between at least one of the contacting surfaces of the body with a half portion of the head, and a tube cutter assembly mounted on the body and including a tube cutter member mounted on the body, a tube abutment member slidably mounted in the body for radial movement towards and away from the cutter member, and control means mounted on the body to move the abutment member towards the cutter member to press a tube between the two members, such two members having a spacing therebetween in register with the openings in the C-shaped body and head. With the above cutter, the opening of the C-shaped body can be aligned with the opening of the C-shaped head and a tube can be inserted through the registering openings of the C-shaped body and head into the tube cutter assembly and the cutter member pressed against the tube to cut the tube through back-and-forth operation of the ratchet handle.

The pawl and ratchet system of a preferred embodiment of the invention comprises ratchet teeth formed on the body or on the head and interrupted by the opening in the body or in the head and two pawls mounted on the body or on the head at a distance greater than the width of the opening in such body or head, whereby there is always one pawl in contacting engagement with the ratchet teeth for the full 360° rotation of the handle around the body.

The abutment member of the cutter assembly preferably comprises a block slidably mounted in a guideway in the body and a V-shaped jaw integral with such block and adapted to engage the tube. The control means preferably includes a bolt rotatably carried by the body and threaded into the block, and a knob secured to the bolt externally of the body to rotate the bolt and move the jaw towards and away from the tube cutter member.

SHORT DESCRIPTION OF THE DRAWINGS

The invention will now be disclosed, by way of example, with reference to the accompanying drawings in which:

FIG. 1 is a perspective view of the tube cutter in accordance with the invention;
FIG. 2 is a side elevation of the tube cutter;
FIG. 3 is a top plan view with respect to FIG. 2 of the tube cutter;
FIG. 4 is an end view taken from the right-hand side of FIG. 2;
FIG. 5 is a view taken along line 5—5 of FIG. 2;
FIG. 6 is a view taken along line 6—6 of FIG. 3;
FIG. 7 is a view taken along line 7—7 of FIG. 3;
FIG. 8 is a view taken along line 8—8 of FIG. 5; and
FIG. 9 is a view taken along line 9—9 of FIG. 2.

DETAILED DESCRIPTION OF A PREFERRED EMBODIMENT

Figure 5:
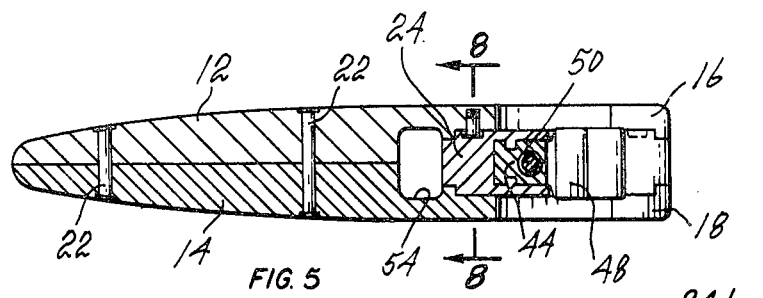
Figure 6:
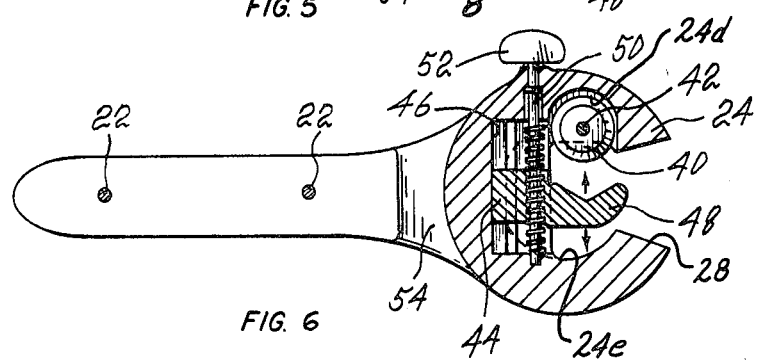

Referring to the drawings, the tube cutter comprises a handle 10 formed in two longitudinally extending, symmetrical half portions 12 and 14 and having a C-shaped head at one end also formed in two symmetrical C-shaped half portions 16 and 18 spacedly facing each other and having a lateral opening 20. Half portions 12 and 16 are integrally united and so are half portions 14 and 18. The handle half portions 12 and 14 are secured together by bolts 22 extending therethrough.

Figure 7:
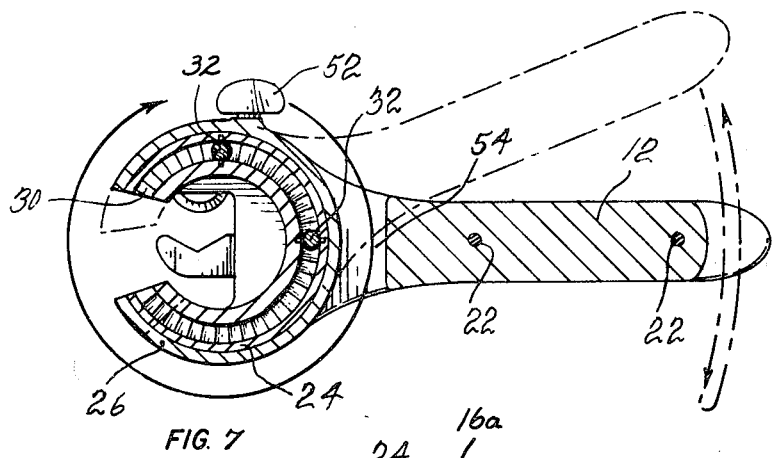
Figure 8:
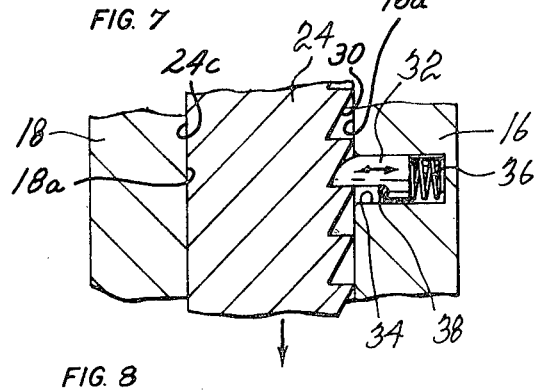

A C-shaped body 24 is rotatably mounted within a shoulder 26 formed in each half portion of the C-shaped head. The body 24 has a lateral opening 28 having a width corresponding to lateral opening 20 of the head. Body 24 has a peripheral outer face 24a exposed between shoulders 26 of head half portions 16 and 18, and opposite radial side faces 24b and 24c in sliding contact with the inner radial side faces 16a and 18a of head half portions 16 and 18 respectively. The cutter is provided with a pawl and ratchet system including ratchet teeth 30 (FIGS. 7 and 8) which are formed in radial side face 24b of the body 24, and pawls 32 mounted on half portion 16 of the head and protruding from side face 16a. The distance between the two pawls 32 is greater than the width of the opening 20 and 28 of the head and body, respectively, whereby there is always one pawl in contacting engagement with the ratchet teeth for the full 360° rotation of the handle around the body. Each pawl consists of a pin fully extending through a hole 34 in the half portion 16 of the head and biased in contact with the teeth 30 by means of spring 36. The pawl is held in position in hole 34 by pin 38.

The cutter assembly includes a cutter wheel 40 rotatably mounted on body 24 about a pin 42 parallel to the rotational axis of the body. Cutter wheel 40 is located in a recess 24d of body 24 and protrudes into central opening 24e of said body 24. An abutment member is located in central opening 24e and consists of a block 44 slidably mounted in a guideway 46 in the body 24 and a V-shaped jaw 48 integral therewith. A bolt 50 is rotatably mounted on body 24 and has a threaded portion which is threaded into block 44, and extends through the exposed outer face 24a of body 24 and a knob 52 is secured thereto exteriorly of the body 24. Guideway 46 is located opposite opening 28 of body 24 and guides the abutment member in a movement towards and away from cutter wheel 40 in a direction transverse to lateral opening 28 of body 24. Rotation of the knob presses the tube placed on the V-shaped jaw 48 against the cutter wheel 40 to cut the tube upon rotation of the ratchet handle.

The above disclosed cutter operates as follows:

Knob 52 is rotated to fully open the jaw 48 and the handle is rotated relative to the body so as to align the openings 20 and 28. Thus the cutter can be positioned along a tube to be cut, the tube simply entering through the lateral openings 20 and 28 and within the aligned space between the cutter wheel 40 and the V-shaped jaw 48. The knob is rotated to tighten the jaw 48 against the tube contacting the cutter wheel 40. The handle is simply activated back-and-forth along as limited an angle of rotation as is necessary depending on the headway, to rotate the body 24 step by step and, consequently, the cutter wheel around the tube. The knob 52 is rotated after each turn or so to further press the cutter wheel within the material of the tube to finally cut the tube.

The two half portions 12 and 14 are notched at their contacting faces, adjacent body 24 to define a through opening 54 of sufficient dimension for the free passage therethrough of knob 52 during full 360° rotation of body 24 relative to handle 10.

Although the invention has been disclosed with reference to a preferred embodiment, it is to be understood that it is not limited to this embodiment and the scope of the invention is determined by the claims only. For example, the ratchet teeth and the pawls could be mounted on both contacting surfaces of the body with a half portion of the head. Furthermore, the ratchet teeth and the pawls could be interchanged on any one of the contacting surfaces of the body with the head.

I claim:

1. A tube cutter comprising:
   (a) an elongated handle formed in two longitudinal symmetrical half portions secured together and having a C-shaped head at one end also formed in two symmetrical half portions spacedly facing each other, each head half portion being integral with one handle half portion, said C-shaped head defining a lateral opening through which a tube can be inserted, each head half portion having an inner radial side face and a peripheral shoulder projecting from said inner radial side face and directed towards the shoulder of the other head half portion;
   (b) a C-shaped body rotatably mounted between the two head half portions and defining a lateral opening of substantially the same width as the lateral opening of the C-shaped head, said body having a peripheral outer face exposed between the shoulders of the two head half portions and radial external side faces in sliding contact with the respective inner radial side faces of said head half portions whereby said C-shaped body can rotate with respect to said elongated handle about an axis transverse to said C-shaped body, the latter being rotatably guided by said peripheral shoulders of said head half portions;
   (c) pawl and ratchet means entirely located at one of the radial body side faces and at the contacting inner radial side face of the corresponding head half portion, said pawl and ratchet means being arranged concentric with the rotational axis of said C-shaped head and allowing free rotation of said C-shaped head with respect to said elongated handle in one direction only; and
   (d) a tube cutter assembly mounted on said body, a tube abutment member slidably mounted in said body for radial movement towards and away from the cutter member and in a direction transverse to said lateral opening, and control means mounted on said body projecting outwardly from the exposed peripheral outer face of said body to move said abutment member towards said cutter member to press a tube between the two members, said two members having a spacing therebetween in register with the lateral openings of said body and said head, whereby a pipe can be inserted through the registering openings in said body and in said head and between said two members, and said cutter member pressed against said tube whereby back-and-forth rotation of said handle causes rotation of said body and cutter member through said pawl and ratchet means to cut the tube, and wherein said handle half portions define a through opening adjacent said body for the free passage of said externally projecting control means during rotation of said body relative to said handle.

2. A tube cutter as claimed in claim 1, wherein the pawl and ratchet means comprises ratchet teeth exposed at one of said side faces of said body and two pawls mounted on said head at a distance greater than the width of said lateral opening whereby there is always one pawl in contacting engagement with the ratchet teeth for the full 360° rotation of said handle around said body, each pawl consisting of a pin fully extending through a hole made in said head and spring loaded to be exposed at the inner radial side face of the related head half portion which is in sliding contact with the radial body side face bearing said ratchet teeth.

3. A tube cutter as claimed in claim 2, wherein said abutment member includes a block slidably mounted in a guideway in said body and a V-shaped jaw integral with said block and adapted to engage the tube, and said control means includes a bolt rotatably carried by said body and threaded into said block, and a knob secured to said bolt externally of said body to rotate said bolt and move said jaw towards and away from the tube cutter member and wherein said cutter member is a cutter wheel rotatably mounted on said body about a rotational axis parallel to that of the body.

* * * * *